(12) United States Patent
Lu et al.

(10) Patent No.: US 11,971,565 B2
(45) Date of Patent: Apr. 30, 2024

(54) ABSORPTION TYPE NEAR INFRARED FILTER

(71) Applicants: PTOT (SUZHOU) INC., Suzhou (CN); PLATINUM OPTICS TECHNOLOGY INC., Taoyuan (TW)

(72) Inventors: Chung-Han Lu, Taoyuan (TW); Hsiao-Ching Shen, Taoyuan (TW); Chun-Cheng Hsieh, Taoyuan (TW); Ming-Zhan Wang, Taoyuan (TW)

(73) Assignees: PTOT (SUZHOU) INC., Suzhou (CN); PLATINUM OPTICS TECHNOLOGY INC., Taoyuan (TW)

( * ) Notice: Subject to any disclaimer, the term of this patent is extended or adjusted under 35 U.S.C. 154(b) by 162 days.

(21) Appl. No.: 17/824,904

(22) Filed: May 26, 2022

(65) Prior Publication Data

US 2022/0283347 A1 Sep. 8, 2022

Related U.S. Application Data

(62) Division of application No. 16/224,728, filed on Dec. 18, 2018, now Pat. No. 11,378,727.

(30) Foreign Application Priority Data

Dec. 19, 2017 (CN) .......................... 201711371902.6

(51) Int. Cl.
*G02B 5/28* (2006.01)
*G01N 21/359* (2014.01)
(Continued)

(52) U.S. Cl.
CPC ........... *G02B 5/282* (2013.01); *G01N 21/359* (2013.01); *G02B 5/208* (2013.01); *G02B 5/223* (2013.01)

(58) Field of Classification Search
CPC ........ G02B 5/282; G02B 5/208; G02B 5/223; G01N 21/359
(Continued)

(56) References Cited

U.S. PATENT DOCUMENTS

2012/0113505 A1   5/2012   Chen et al.
2016/0139308 A1   5/2016   Kim et al.

FOREIGN PATENT DOCUMENTS

CN   105074513 A   11/2015
CN   106062591 A   10/2016
(Continued)

OTHER PUBLICATIONS

Japan Patent Office. First Office Action, dated Nov. 19, 2019.
(Continued)

*Primary Examiner* — Joseph P Martinez
*Assistant Examiner* — Grant A Gagnon (57) ABSTRACT

An absorption type near-infrared filter comprising a first multilayer film, a second multilayer film, and an absorption film, wherein in the ultraviolet band, the difference of between the wavelength with the transmittance at 80% of the absorbing film and the wavelength with the reflectivity at 80% of the first multilayer film falls in the range between 25 nm and 37 nm, the difference of between the wavelength with the transmittance at 50% of the absorbing film and the wavelength with the reflectivity at 50% of the first multilayer film falls in the range between 6 nm and 14 nm, and the difference of between the wavelength with the transmittance at 20% of the absorbing film and the wavelength with the reflectivity at 20% of the first multilayer film falls in the range between −6 nm and 2.5 nm.

20 Claims, 4 Drawing Sheets (51) Int. Cl.
*G02B 5/20* (2006.01)
*G02B 5/22* (2006.01)
*G02B 5/30* (2006.01)

(58) Field of Classification Search
USPC .......................................................... 359/359
See application file for complete search history.

(56) References Cited

FOREIGN PATENT DOCUMENTS

| | | |
|---|---|---|
| CN | 205787194 U | 12/2016 |
| CN | 106405707 A | 2/2017 |
| CN | 107076895 A | 8/2017 |
| JP | 2012137646 A | 7/2012 |
| KR | 1020140120690 A | 10/2014 |
| KR | 1020170086018 A | 7/2017 |
| TW | M546508 U | 8/2017 |
| WO | 2016171219 A1 | 10/2016 |

OTHER PUBLICATIONS

China Patent Office, Office Action, dated Aug. 23, 2021.
China Patent Office, Office Action, dated Dec. 14, 2020.
Korea Patent Office, Office Action, dated Feb. 14, 2020.
Taiwan Patent Office, Notice of Allowance, dated Apr. 30, 2018.
Taiwan Patent Office, Notice of Allowance, dated Aug. 19, 2019.
Taiwan Patent Office, Office Action, dated Nov. 19, 2018.
China Patent Office, Third Office Action, dated Feb. 7, 2022, Application No. 201711371902.6, Filing Date Dec. 19, 2017, 6 pages.

ABSORPTION TYPE NEAR INFRARED FILTER

CROSS REFERENCE TO RELATED APPLICATION

This application is a Divisional of application Ser. No. 16/224,728, filed Dec. 18, 2018, which claims the priority benefit of Chinese Patent Application Serial Number 201711371902.6, filed on Dec. 19, 2017, the full disclosure of which is incorporated herein by reference.

BACKGROUND

Technical Field

The present disclosure relates to the technical field of filters, and more particularly to an absorption type near-infrared filter.

Related Art

Generally, human eyes perceive the visible light wavelength ranging between about 400 nm and 700 nm. The invisible light includes infrared having a wavelength ranging between 700 nm and 1200 nm and ultraviolet having a wavelength between ranging 100 nm and 400 nm. Infrared does not affect color for human vision, but it is not the case for photographic devices such as cameras, video cameras or cell phone cameras. A photographic lens is generally provided with a plurality of optical lenses, filters and image sensing components, such as a charge coupled device (CCD) or a complementary metal oxide semiconductor (CMOS), in a lens mount. The image sensing component has high sensitivity sensing the light having a wavelength ranging between 400 nm to 1200 nm, capable of capturing infrared in the invisible light. In order to avoid the influence of the infrared on the image, a filter or a filtering lens must be installed in front of the image sensing element to block the infrared from entering the image sensing element to correct the color shift phenomenon of the image. At present, the filter includes a reflection type filter and an absorption type filter. However, the current filter is prone to have problems such as color shift, chromatic aberration, stray light, or ghosting, thereby affecting the presentation of the photographic image.

SUMMARY

The embodiments of the present disclosure provides an absorption type near-infrared filter to solve the problems such as color shift, chromatic aberration, stray light, or ghosting, to improve the image quality.

The present disclosure provides an absorption type near-infrared filter comprising a first multilayer film, a second multilayer film, and an absorption film between the first multilayer film and the second multilayer film. The absorption film comprises an infrared absorbing dye with a weight percentage between 1% and 3%, wherein in the infrared band, the difference between the wavelength with the transmittance at 80% of the absorption film and the wavelength with the reflectivity at 80% of the first multilayer film ranges between 130 nm and 145 nm; the difference between the wavelength with the transmittance at 50% of the absorption film and the wavelength with the reflectivity at 50% of the first multilayer film ranges between 75 nm and 90 nm; the difference between the wavelength with the transmittance at 20% of the absorption film and the wavelength with the reflectivity at 20% of the first multilayer film ranges between 25 nm and 45 nm.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals is used to refer to the same or similar elements throughout the disclosure.

Figure 1:
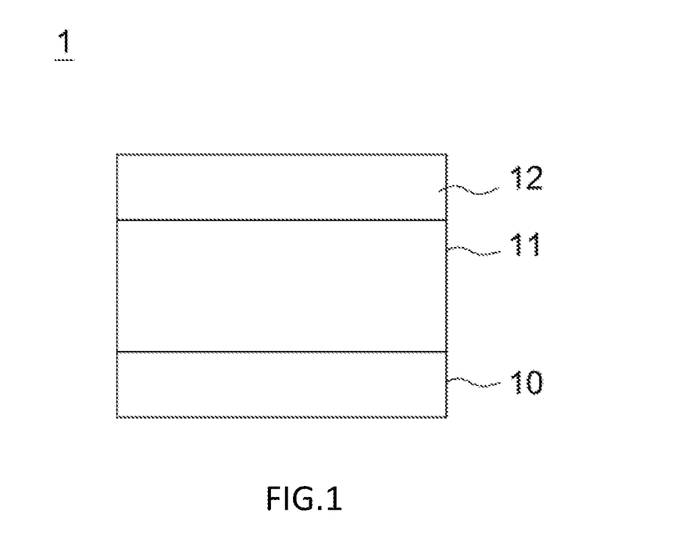
FIG. 1 shows the schematic diagram of an absorption type near-infrared filter of the present disclosure.

FIG. 1 shows the schematic diagram of an absorption type near-infrared filter of the present disclosure. As shown in the figure, the absorption type near-infrared filter 1 comprises a first multilayer film 10, a second multilayer film 12, and an absorption film 11 between the first multilayer film 10 and the second multilayer film 12. The absorption film 11 of the present disclosure may include only an infrared absorption film, or a composite absorption film with the capability of absorbing infrared and ultraviolet. Alternatively, the absorption film 11 may include both an infrared absorption film/layer and an ultraviolet absorption film/layer.

The first multilayer film 10 and the second multilayer film 12 are respectively stacked by a plurality of layers. The material of each layer of the plurality of layers of the first multilayer film 10 and the second multilayer film 12 comprises at least one selected from the group consisting of $TiO_2$, $SiO_2$, $Y_2O_3$, $MgF_2$, $Al_2O_3$, $Nb_2O_5$, $AlF_3$, $Bi_2O_3$, $Gd_2O_3$, $LaF_3$, $PbTe$, $Sb_2O_3$, $SiO$, $SiN$, $TA2Os$, $ZnS$, $ZnSe$, $ZrO_2$, and $Na_3AlF_6$. One of the first multilayer film 10 and the second multilayer film 12 comprises an infrared cut structure, and the other comprises an anti-reflective structure. The difference between the thickness of the first multilayer film 10 and the thickness of the second multilayer film 12 is between 0 nm and 4000 nm.

Figure 2:
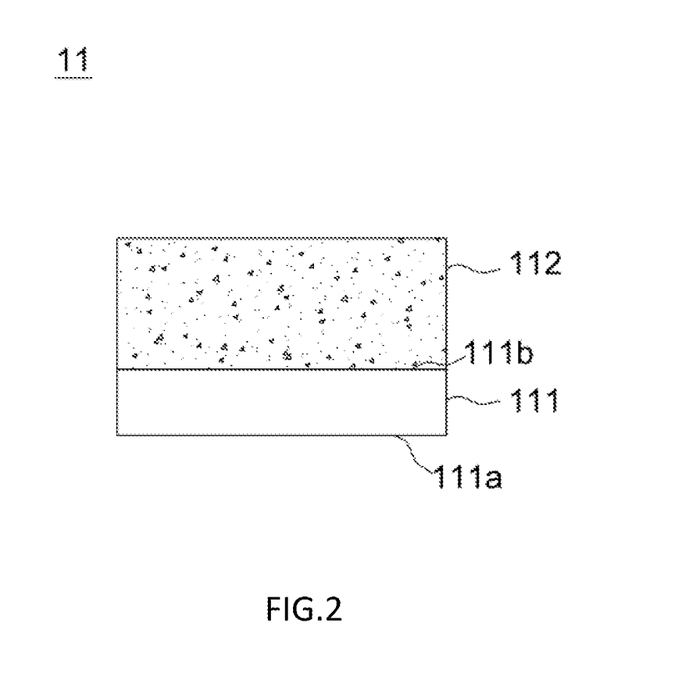
FIG. 2 shows the schematic diagram of the absorption film of the present disclosure.

FIG. 2 shows the schematic diagram of the absorption film of the present disclosure. The absorption film 11 comprises a transparent substrate 111 and a single infrared absorbing layer 112. The transparent substrate 111 has a first surface 111a and a second surface 111b opposite to the first surface 111a. The first multilayer film 10 or the second multilayer film 12 is formed on the first surface 111a of the transparent substrate 111, and the infrared absorption layer 112 is formed on the second surface 111b of the transparent substrate 111. If the first multilayer film 10 is formed on the first surface 111a of the transparent substrate 111, the second multilayer film 12 is plated on the infrared absorbing structure 112 and opposed to the first multilayer film 10. If the second multilayer film 12 is formed on the first surface 111a of the transparent substrate 111, the first multilayer film 10 is formed on the infrared absorbing structure 112 and opposed to the second multilayer film 12.

The infrared absorbing structure 112 includes a transparent resin and an infrared absorbing dye. The infrared absorbing dye is dissolved and dispersed in the transparent resin. The material of the transparent resin is selected from the group consisting of epoxy resin, polyacrylate, polyolefin, polycarbonate, polycycloolefin, polyurethane, polyether, polyoxyalkylene and polyvinyl butyral. The transparent resin has a light transmittance of 85% or more. Alternatively, the transparent resin has a light transmittance of 90% or more. The material of the transparent substrate 111 comprises, for example, glass, acrylic (PMMA) or quartz. The transparent substrate 111 may comprise an infrared absorbing coloring material to constitute an infrared absorbing substrate. In view of the transparent substrate 111 made of glass, the glass is a fluorophosphate-based infrared filter glass or a phosphate-based infrared filter glass. The weight percentage of the infrared absorbing dye contained in the absorption film 11 is between 1% and 3%. The material of the infrared absorbing dye comprises at least one selected from the group consisting of an azo compound, a diimonium compound, a dithiophenol metal complex, a phthalocyanine compound, a squaraine compound, and a cyanine compound. Alternatively, the material of the infrared absorbing dye comprises at least one selected from the group consisting of a phthalocyanine compound, a squaraine compound, and a cyanine compound. The wavelength of the light absorbed by the infrared absorbing dye is between 650 nm and 1100 nm, and alternatively may be between 650 nm and 750 nm. The infrared absorbing structure 112 is prepared by preparing an infrared absorbing solution first. The infrared absorbing solution is a mixture of an infrared absorbing dye and a solvent. The solvent is selected from ketones, ethers, esters, alcohols, alcohol-ethers, hydrocarbons or terpines. The infrared absorbing solution is further added with a leveling agent, an antistatic agent, a light stabilizer, a heat stabilizer, an antioxidant, a dispersing agent, a flame retardant, a moisturizing agent or a plasticizer. The infrared absorbing solution is dissolved and dispersed in the transparent resin to form an infrared absorbing coating liquid. Then, the infrared absorbing coating liquid is applied onto the transparent substrate 111. The coating method may be selected by dip coating, cast coating, spray coating, spin coating, bead coating, bar coating or knife coating. The infrared absorbing coating liquid of the present embodiment is applied to the transparent substrate 111 by a coating method in which the coating rotation speed is between 300 rpm and 1100 rpm. After the infrared absorbing coating liquid is applied onto the transparent substrate 111 by the coating method, the infrared absorbing coating liquid applied to the transparent substrate 111 is sequentially thermally dried and cured to form the infrared absorbing layer 112 on the transparent substrate 111. Curing can be performed by using either thermal curing or photocuring, or both thermal curing and photocuring. The temperature of the thermal curing is between 100 degrees Celsius and 180 degrees Celsius, and the photocuring luminous flux is between 8000 $J/m^2$ and 10000 $J/m^2$.

Figure 3:
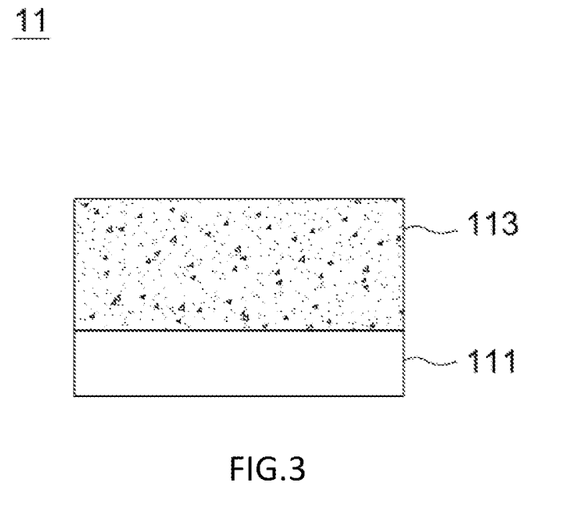
FIG. 3 shows the schematic diagram of another embodiment of the absorption film of the present disclosure.

FIG. 3 shows the schematic diagram of another embodiment of the absorption film of the present disclosure. The absorption film 11 includes a transparent substrate 111, an infrared and ultraviolet mixed absorbing film 113. The infrared and ultraviolet mixed absorbing film is formed on the transparent substrate 111. The infrared and ultraviolet mixed absorbing film 113 is formed by adding an infrared absorbing dye and an ultraviolet absorbing dye to a transparent resin. The weight percentage of the infrared absorbing dye contained in the absorption film 11 is between 1% and 3%, and the weight percentage of the ultraviolet absorbing dye contained in the absorption film 11 is between 4% and 10%. The material of the ultraviolet absorbing dye comprises at least one selected from the group consisting of an azomethine compound, a lanthanoid compound, a benzotriazole compound, and a triazine compound. The material of the infrared absorbing dye has been described above and will not be described herein. The material of the transparent substrate 111 comprises, for example, glass, acryl (PMMA) or quartz. In another embodiment, the transparent substrate 111 further contains an infrared absorbing coloring material to form an infrared absorbing substrate. In view of the transparent substrate 111 made of a glass material, the glass is a fluorophosphate-based infrared filter glass or a phosphate-based infrared filter glass.

Figure 4:
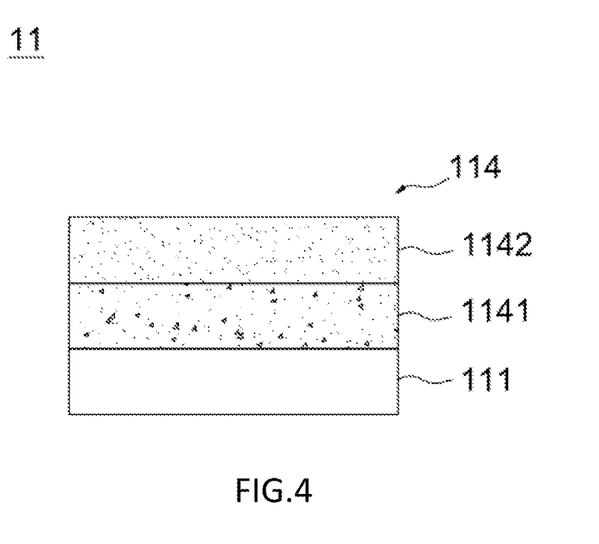
FIG. 4 shows the schematic diagram of another embodiment of the absorption film of the present disclosure.

FIG. 4 shows the schematic diagram of another embodiment of the absorption film of the present disclosure. The absorption film 11 includes a transparent substrate 111 and an infrared and ultraviolet layered absorbing film 114. The infrared and ultraviolet layered absorbing film 114 is formed on the transparent substrate 111. The infrared and ultraviolet layered absorbing film 114 comprises an infrared absorption layer 1141 and an ultraviolet absorption layer 1142. The infrared absorbing layer 1141 comprises a transparent resin and an infrared absorbing dye. The absorption film 11 contains an infrared absorbing dye in a weight percentage between 1% and 3%; the ultraviolet absorbing layer 1142 comprises a transparent resin and an ultraviolet absorbing dye. The absorption film 11 contains the ultraviolet absorbing dye in a weight percentage between 4% and 10%. In the present embodiment, the infrared absorbing layer 1141 is formed on the transparent substrate 111, and the ultraviolet absorbing layer 1142 is formed on the infrared absorbing layer 1141. In another embodiment, the positions of the infrared absorbing layer 1141 and the ultraviolet absorbing layer 1142 may be reversed. That is, the ultraviolet absorbing layer 1142 is first provided on the transparent substrate 111, and the infrared absorbing layer 1141 is provided on the ultraviolet absorbing layer 1142. In another embodiment, the transparent substrate 111 may also include an infrared absorbing pigment. The material of the transparent resin of the infrared absorbing layer 1141, the material of the transparent resin of the ultraviolet absorbing layer 1142, the material of the infrared absorbing dye of the infrared absorbing layer 1141, the material of the ultraviolet absorbing dye of ultraviolet absorbing layer 1142 have been described above and will not be described herein. The preparation method of the ultraviolet absorbing layer 1142 and the preparation method of the infrared absorbing layer 1141 are the same as those of the infrared absorbing structure of FIG. 1, and will not be described herein. The preparation method of the ultraviolet absorbing layer 1142 and the preparation method of the infrared absorbing layer 1141 are the same as those of the infrared absorbing structure of FIG. 1, and will not be described herein.

In view of the absorption film 11 being a single infrared absorption film (as shown in FIG. 2), or being an infrared and ultraviolet mixed absorption film (as shown in FIG. 3) or being an infrared and ultraviolet layered absorption film (as shown in FIG. 4), according to the spectrum of the absorption film 11 and the first multilayer film 10 of the present disclosure, the absorption film 11 of the present disclosure satisfies the following conditions:
 (1) in the infrared band, the difference between the wavelength ($\lambda_{T80\%}$) with the transmittance at 80% of the absorption film 11 and the wavelength ($\lambda_{R80\%}$) with the reflectivity at 80% of the first multilayer film 10 ranges between 130 nm and 145 nm;
 (2) in the infrared band, the difference between the wavelength ($\lambda_{T50\%}$) with the transmittance at 50% of the absorption film 11 and the wavelength ($\lambda_{R50\%}$) with the reflectivity at 50% of the first multilayer film 10 ranges between 75 nm and 90 nm;
 (3) in the infrared band, the difference between the wavelength ($\lambda_{T20\%}$) with the transmittance at 20% of the absorption film 11 and the wavelength ($\lambda_{R20\%}$) with the reflectivity at 20% of the first multilayer film 10 ranges between 25 nm and 45 nm;
 (4) in the infrared band, the absolute difference between the wavelength ($\lambda_{T80\%}$) with the transmittance at 80% of the absorption film 11 and the wavelength a ($\lambda_{T50\%}$) with the transmittance at 50% of the absorption film 11 is lower than 50 nm;
 (5) in the infrared band, the absolute difference between the wavelength ($\lambda_{T50\%}$) with the transmittance at 50% of the absorption film 11 and the wavelength ($\lambda_{T20\%}$) with the transmittance at 20% of the absorption film 11 is lower than 42 nm.

In view of the absorption film 11 being a single composite absorption film with infrared and ultraviolet absorption function (as shown in FIG. 3), or being a combination of the infrared absorption film and the ultraviolet absorption film (as shown in FIG. 4), according to the spectrum of the absorption film 11 and the first multilayer film 10 of the present disclosure, the absorption film 11 of the present disclosure satisfies the following conditions:
 (1) in the ultraviolet band, the difference between the wavelength ($\lambda_{T80\%}$) with the transmittance at 80% of the absorption film 11 and the wavelength ($\lambda_{R80\%}$) with the reflectivity at 80% of the first multilayer film 10 ranges between 23 nm and 40 nm;
 (2) in the ultraviolet band, the difference between the wavelength ($\lambda_{T50\%}$) with the transmittance at 50% of the absorption film 11 and the wavelength ($\lambda_{R50\%}$) with the reflectivity at 50% of the first multilayer film 10 ranges between 3 nm and 14 nm;
 (3) in the ultraviolet band, the difference between the wavelength ($\lambda_{T20\%}$) with the transmittance at 20% of the absorption film 11 and the wavelength ($\lambda_{R20\%}$) with the reflectivity at 20% of the first multilayer film 10 ranges between −15 nm and 2.5 nm;
 (4) in the ultraviolet band, the absolute difference between the wavelength ($\lambda_{T80\%}$) with the transmittance at 80% of the absorption film 11 and the wavelength ($\lambda_{T50\%}$) with the transmittance at 50% of the absorption film 11 is lower than 23 nm;
 (5) in the ultraviolet band, the absolute difference between the wavelength ($\lambda_{T50\%}$) with the transmittance at 50% of the absorption film 11 and the wavelength ($\lambda_{T20\%}$) with the transmittance at 20% of the absorption film 11 is lower than 16 nm;
 (6) the difference between the wavelength ($\lambda_{T80\%}$) with the transmittance at 80% of the absorption film 11 in the infrared band and the wavelength ($\lambda_{T80\%}$) with the transmittance at 80% of the absorption film 11 in the ultraviolet band ranges between 126 nm and 164 nm;
 (7) the difference between the wavelength ($\lambda_{T50\%}$) with the transmittance at 50% of the absorption film 11 in the infrared band and the wavelength ($\lambda_{T50\%}$) with the transmittance at 50% of the absorption film 11 in the ultraviolet band ranges between 195 nm and 239 nm;
 (8) the difference between the wavelength ($\lambda_{T20\%}$) with the transmittance at 20% of the absorption film 11 in the infrared band and the wavelength ($\lambda_{T20\%}$) with the transmittance at 20% of the absorption film 11 in the ultraviolet band ranges between 244 nm and 309 nm.

First Embodiment

The structure of the absorption type near-infrared filter of the embodiment comprises a single infrared absorption film, and the infrared absorption film comprises an infrared absorption dye. The thickness of the first multilayer film of the embodiment is between 4000 nm and 4500 nm. The thickness of the two-layered film structure is between 600 nm and 700 nm. The first multilayer film and the second multilayer film in this embodiment are asymmetrically coated, as shown in FIG. 2.

Figure 5:
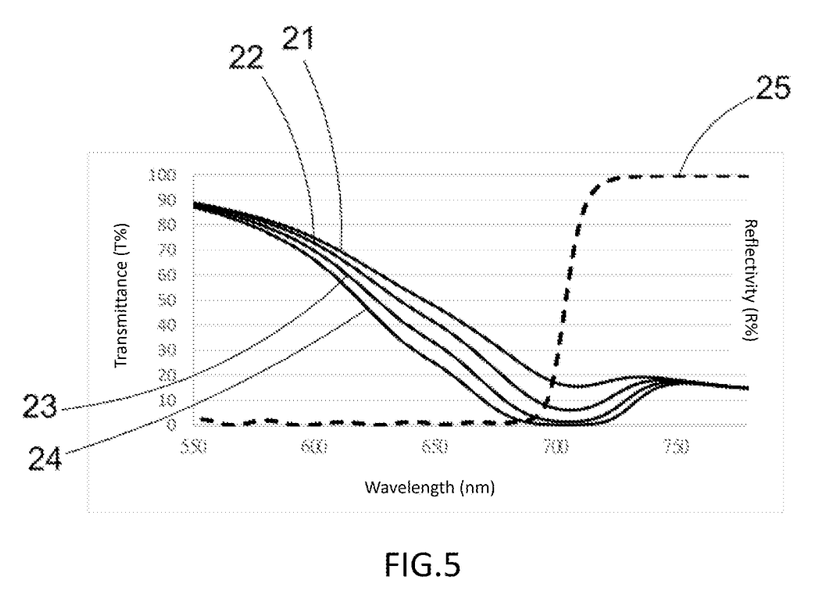
FIG. 5 shows the infrared spectrum of the absorption type near-infrared filter of the first embodiment and the second embodiment of the present disclosure.

Table 1 provides the actual data for ten sets of absorption films. The absorption film of the embodiment is a single infrared absorption film A1. The weight percentage of the infrared absorbing dye of the infrared absorbing structure A1 of each set is different. The rotating speed for forming the infrared absorbing structure A1 between 400 rpm and 650 rpm. Refer to FIG. 5 illustrating the first transmittance spectrum curve 21, the second transmittance spectrum curve 22, the third transmittance spectrum curve 23, the fourth transmittance spectrum curve 24, and the first reflectivity spectrum curve 25. The first transmittance spectrum curve 21, the second transmittance spectrum curve 22, the third transmittance spectrum curve 23, and the fourth transmittance spectrum curve 24 respectively illustrate the transmittance spectrum curve of the infrared absorption film A1 in the infrared band for No. 1, No. 2, No. 5 and No. 10 in the following table. The first reflectivity spectrum curve 25 is a reflectivity spectrum curve of the first multilayer film R1 in the infrared band.

According to the spectrum curve of the infrared absorbing structure A1 and the first multilayer film R1 (FIG. 5), in the infrared band, the difference (A1 ($\lambda_{T80\%}$)–R1 ($\lambda_{R80\%}$)) between the wavelength ($\lambda_{T80\%}$) with the transmittance at 80% of the infrared absorption film A1 and the wavelength ($\lambda_{R80\%}$) with the reflectivity at 80% of the first multilayer film R1, the difference (A1 ($\lambda_{T50\%}$)–R1 ($\lambda_{R50\%}$)) between the wavelength ($\lambda_{T50\%}$) with the transmittance at 50% of the infrared absorption film A1 and the wavelength ($\lambda_{R50\%}$) with the reflectivity at 50% of the first multilayer film R1, the difference (A1 ($\lambda_{T20\%}$)–R1 ($\lambda_{R20\%}$)) between the wavelength ($\lambda_{T20\%}$) with the transmittance at 20% of the infrared absorption film A1 and the wavelength ($\lambda_{R20\%}$) with the reflectivity at 20% of the first multilayer film R1, the difference ($\Delta\lambda_{(0°-30°)T50\%}$) between the incident angle 0 degrees to 30 degrees with the transmittance at 50% of the infrared absorption film A1, and the difference ($\Delta\lambda_{(0°-30°)T20\%}$) between the incident angle 0 degrees to 30 degrees with the transmittance at 20% of the infrared absorption film A1 are calculated.

It may be summarized from No. 3 to No. 10 in the above Table 1. The weight percentage of the infrared absorbing dye contained in the infrared absorbing structure A1 is controlled to be between 1% and 3%, and the rotation speed for forming the infrared absorbing structure A1 is controlled between 400 rpm and 650 rpm. The spectrum of each of the infrared absorbing structure A1 and the first multilayer film R1 satisfies the following conditions: the difference of between the wavelength with the transmittance at 80% of the infrared absorption film A1 and the wavelength with the reflectivity at 80% of the first multilayer film R1 falls in the range between 135 nm and 145 nm, the difference of between the wavelength with the transmittance at 50% of the infrared absorption film A1 and the wavelength with the reflectivity at 50% of the first multilayer film R1 falls in the range between 75 nm and 90 nm, and the difference of between the wavelength with the transmittance at 20% of the infrared absorption film A1 and the wavelength with the reflectivity at 20% of the first multilayer film R1 falls in the range between 25 nm and 45 nm.

When the spectrum of the infrared absorbing structure A1 satisfies the above conditions, the difference between the incident angle 0 degrees to 30 degrees with the transmittance at 50% of the infrared absorption film A1 is less than 2 nm, and the difference between the incident angle 0 degrees to 30 degrees with the transmittance at 20% of the infrared absorption film A1 is less than 6 nm. This indicates the offset of the spectrum curves between the incident angles from 0 degrees to 30 degrees for the infrared absorption film A1 is small. The problems of color shift, chromatic aberration, stray light and ghosting caused by the coating of the near-infrared filter is effectively solved. The transparent substrate of the infrared absorbing structure A1 of the present embodiment may also contain an infrared absorbing coloring material to achieve the above effects.

Second Embodiment

Different from the absorption type near-infrared filter in the first embodiment, the absorption type near-infrared filter of the present embodiment adopts an infrared and ultraviolet mixed absorbing film A2. The infrared and ultraviolet absorbing layer absorbing structure A2 has an infrared absorbing dye and an ultraviolet absorbing dye, as shown in FIG. 3.

TABLE 1

| No. | 1 | 2 | 3 | 4 | 5 |
|---|---|---|---|---|---|
| Infrared absorbing dye (%) | 0.68 | 0.94 | 1.24 | 1.47 | 1.53 |
| Transparent resin (%) | 100 | 100 | 100 | 100 | 100 |
| A1 ($\lambda_{T80\%}$)-R1 ($\lambda_{R80\%}$)(nm) | 129.3 | 133.2 | 135.8 | 137.0 | 137.7 |
| A1 ($\lambda_{T50\%}$)-R1 ($\lambda_{R50\%}$)(nm) | 61.1 | 70.9 | 77.1 | 79.0 | 79.8 |
| A1 ($\lambda_{T20\%}$)-R1 ($\lambda_{R20\%}$)(nm) | 5.8 | 21.2 | 28.2 | 30.6 | 32.1 |
| $\Delta\lambda_{(0°-30°)T50\%}$ | 3.9 | 3.0 | 1.9 | 1.8 | 1.7 |
| $\Delta\lambda_{(0°-30°)T20\%}$ | 20.8 | 10.0 | 6.0 | 5.0 | 4.5 |
| No. | 6 | 7 | 8 | 9 | 10 |
| Infrared absorbing dye (%) | 1.58 | 1.75 | 1.83 | 2.02 | 2.73 |
| Transparent resin (%) | 100 | 100 | 100 | 100 | 100 |
| A1 ($\lambda_{T80\%}$)-R1 ($\lambda_{R80\%}$)(nm) | 139.0 | 139.5 | 140.3 | 141.3 | 142.3 |
| A1 ($\lambda_{T50\%}$)-R1 ($\lambda_{R50\%}$)(nm) | 82.0 | 83.0 | 83.6 | 84.3 | 86.7 |
| A1 ($\lambda_{T20\%}$)-R1 ($\lambda_{R20\%}$)(nm) | 34.2 | 35.5 | 37.5 | 39.4 | 41.8 |
| $\Delta\lambda_{(0°-30°)T50\%}$ | 1.6 | 1.6 | 1.6 | 1.6 | 1.7 |
| $\Delta\lambda_{(0°-30°)T20\%}$ | 4.0 | 3.7 | 3.4 | 3.0 | 2.7 |

Figure 6:
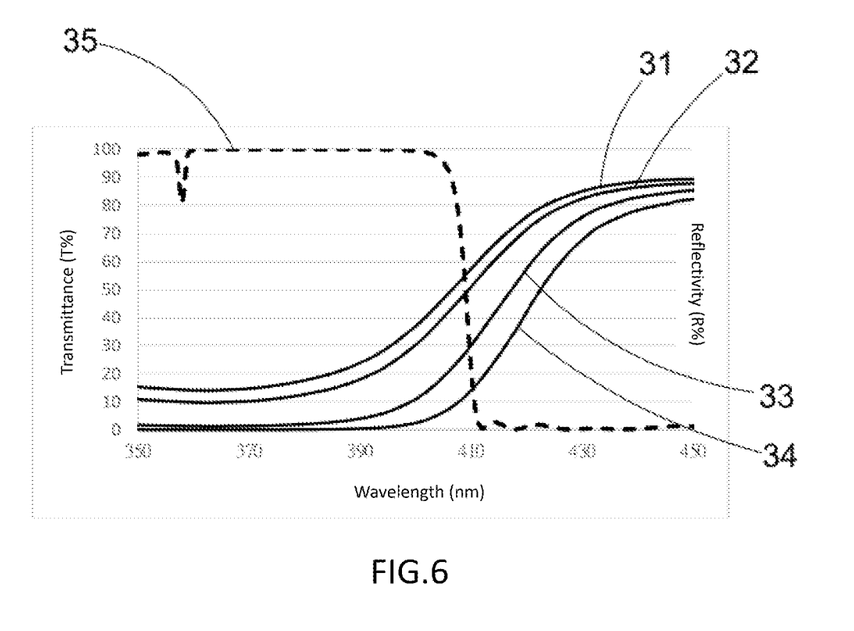
FIG. 6 shows the ultraviolet light spectrum of the absorption type near-infrared filter of the first embodiment and the second embodiment of the present disclosure.

Table 2 below provides actual data for ten sets of absorption films. The absorption film is an infrared and ultraviolet mixed layer absorption film A2. The weight percentage of the infrared absorbing dye and the ultraviolet absorbing dye of each infrared and ultraviolet mixed layer absorption film A2 is different. The rotating speed for coating forming the infrared absorbing structure A2 between 400 rpm and 650 rpm. Refer to FIG. 5 and FIG. 6. The spectrum curves in the infrared band of the infrared and ultraviolet mixed layer absorption film A2 and the first multilayer film R1 of the second embodiment are similar to the infrared absorption film A1 and the first multilayer film R1 of the first embodiment. Therefore, the spectrum curve of the infrared and ultraviolet mixed layer absorption film A2 in the infrared band of this embodiment may refer to FIG. 5. FIG. 6 includes the fifth transmittance spectrum curve 31, the sixth transmittance spectrum curve 32, the seventh transmittance spectrum curve 33, the eighth transmittance spectrum curve 34, and the second reflectivity spectrum curve 35. The fifth transmittance spectrum curve 31, the sixth transmittance spectrum curve 32, the seventh transmittance spectrum curve 33, the eighth transmittance spectrum curve 34 respectively illustrate the transmittance spectrum curve of the infrared and ultraviolet mixed layer absorption film A2 in the ultraviolet band for No. 1, No. 2, No. 5 and No. 10 in the following table. The second reflectivity spectrum curve 35 is a reflectivity spectrum curve of the first multilayer film R1 in the ultraviolet band.

According to the spectrum curve of the infrared and ultraviolet mixed layer absorption film A2 and the first multilayer film R1 (FIG. 5), in the infrared band, the difference (A2 ($\lambda_{T80\%}$)–R1 ($\lambda_{R80\%}$)) between the wavelength ($\lambda_{T80\%}$) with the transmittance at 80% of the infrared and ultraviolet mixed layer absorption film A2 and the wavelength ($\lambda_{R80\%}$) with the reflectivity at 80% of the first multilayer film R1, the difference (A2($\lambda_{T50\%}$)–R1($\lambda_{R50\%}$)) between the wavelength ($\lambda_{T50\%}$) with the transmittance at 50% of the infrared and ultraviolet mixed layer absorption film A2 and the wavelength ($\lambda_{R50\%}$) with the reflectivity at 50% of the first multilayer film R1, the difference (A2 ($\lambda_{T20\%}$)–R1 ($\lambda_{R20\%}$)) between the wavelength ($\lambda_{T20\%}$) with the transmittance at 20% of the infrared and ultraviolet mixed layer absorption film A2 and the wavelength ($\lambda_{R20\%}$) with the reflectivity at 20% of the first multilayer film R1, the difference ($\Delta\lambda_{(0°-30°)T50\%}$) between the incident angle 0 degrees to 30 degrees with the transmittance at 50% of the infrared and ultraviolet mixed layer absorption film A2, and the difference ($\Delta\lambda_{(0°-30°)T20\%}$) between the incident angle 0 degrees to 30 degrees with the transmittance at 20% of the infrared and ultraviolet mixed layer absorption film A2 are calculated.

According to the spectrum curve of the infrared and ultraviolet mixed layer absorption film A2 and the first multilayer film R1 (FIG. 6), in the ultraviolet band, the difference (A2 ($\lambda_{T80\%}$)–R1 ($\lambda_{R80\%}$)) between the wavelength ($\lambda_{T80\%}$) with the transmittance at 80% of the infrared and ultraviolet mixed layer absorption film A2 and the wavelength ($\lambda_{R80\%}$) with the reflectivity at 80% of the first multilayer film R1, the difference (A2 ($\lambda_{T50\%}$)–R1 ($\lambda_{R50\%}$)) between the wavelength ($\lambda_{T50\%}$) with the transmittance at 50% of the infrared and ultraviolet mixed layer absorption film A2 and the wavelength ($\lambda_{R50\%}$) with the reflectivity at 50% of the first multilayer film R1, the difference (A2 ($\lambda_{T20\%}$)–R1 ($\lambda_{R20\%}$)) between the wavelength ($\lambda_{T20\%}$) with the transmittance at 20% of the infrared and ultraviolet mixed layer absorption film A2 and the wavelength ($\lambda_{R20\%}$) with the reflectivity at 20% of the first multilayer film R1, the difference ($\Delta\lambda_{(0°-30°)T50\%}$) between the incident angle 0 degrees to 30 degrees with the transmittance at 50% of the infrared and ultraviolet mixed layer absorption film A2, and the difference ($\Delta\lambda_{(0°-30°)T20\%}$)) between the incident angle 0 degrees to 30 degrees with the transmittance at 20% of the infrared and ultraviolet mixed layer absorption film A2 are calculated.

TABLE 2

| No. | 1 | 2 | 3 | 4 | 5 |
|---|---|---|---|---|---|
| Infrared absorbing dye (%) | 0.68 | 0.94 | 1.24 | 1.47 | 1.53 |
| Ultraviolet absorbing dye (%) | 2.7 | 3.5 | 4.2 | 5.28 | 7.68 |
| Transparent resin (%) | 100 | 100 | 100 | 100 | 100 |

| No. | 6 | 7 | 8 | 9 | 10 |
|---|---|---|---|---|---|
| Infrared absorbing dye (%) | 1.58 | 1.75 | 1.83 | 2.02 | 2.73 |
| Ultraviolet absorbing dye (%) | 7.94 | 8.58 | 8.94 | 9.23 | 9.54 |
| Transparent resin (%) | 100 | 100 | 100 | 100 | 100 |

IN THE INFRARED BAND

| No. | 1 | 2 | 3 | 4 | 5 |
|---|---|---|---|---|---|
| A2 ($\lambda_{T80\%}$)-R1 ($\lambda_{R80\%}$)(nm) | 129.3 | 133.2 | 135.8 | 137.0 | 137.7 |
| A2 ($\lambda_{T50\%}$)-R1 ($\lambda_{R50\%}$)(nm) | 61.1 | 70.9 | 77.1 | 79.0 | 79.8 |
| A2 ($\lambda_{T20\%}$)-R1 ($\lambda_{R20\%}$)(nm) | 5.8 | 21.2 | 28.2 | 30.6 | 32.1 |
| $\Delta\lambda_{(0°-30°)T50\%}$ | 3.9 | 3.0 | 1.9 | 1.8 | 1.7 |
| $\Delta\lambda_{(0°-30°)T20\%}$ | 20.8 | 10.0 | 6.0 | 5.0 | 4.5 |

| No. | 6 | 7 | 8 | 9 | 10 |
|---|---|---|---|---|---|
| A2 ($\lambda_{T80\%}$)-R1 ($\lambda_{R80\%}$)(nm) | 139.0 | 139.5 | 140.3 | 141.3 | 142.3 |
| A2 ($\lambda_{T50\%}$)-R1 ($\lambda_{R50\%}$)(nm) | 82.0 | 83.0 | 83.6 | 84.3 | 86.7 |
| A2 ($\lambda_{T20\%}$)-R1 ($\lambda_{R20\%}$)(nm) | 34.2 | 35.5 | 37.5 | 39.4 | 41.8 |
| $\Delta\lambda_{(0°-30°)T50\%}$ | 1.6 | 1.6 | 1.6 | 1.6 | 1.7 |
| $\Delta\lambda_{(0°-30°)T20\%}$ | 4.0 | 3.7 | 3.4 | 3.0 | 2.7 |

TABLE 2-continued

| IN THE ULTRAVOILET BAND | | | | | |
|---|---|---|---|---|---|
| No. | 1 | 2 | 3 | 4 | 5 |
| A2 ($\lambda_{T80\%}$)-R1 ($\lambda_{R80\%}$)(nm) | 16.5 | 20.3 | 24.4 | 26.5 | 28.3 |
| A2 ($\lambda_{T50\%}$)-R1 ($\lambda_{R50\%}$)(nm) | −3.8 | −0.8 | 3.2 | 5.2 | 6.8 |
| A2 ($\lambda_{T20\%}$)-R1 ($\lambda_{R20\%}$)(nm) | −27.8 | −20.4 | −12.6 | −9.5 | −7.3 |
| $\Delta\lambda_{(0°\text{-}30°)T50\%}$ | 7.1 | 5.0 | 1.9 | 0.5 | −0.4 |
| $\Delta\lambda_{(0°\text{-}30°)T20\%}$ | 10.9 | 10.4 | 8.9 | 7.5 | 6.0 |
| No. | 6 | 7 | 8 | 9 | 10 |
| A2 ($\lambda_{T80\%}$)-R1 ($\lambda_{R80\%}$)(nm) | 30.1 | 31.5 | 33.5 | 35.6 | 38.2 |
| A2 ($\lambda_{T50\%}$)-R1 ($\lambda_{R50\%}$)(nm) | 8.2 | 9.2 | 10.2 | 11.1 | 12.0 |
| A2 ($\lambda_{T20\%}$)-R1 ($\lambda_{R20\%}$)(nm) | −5.3 | −3.8 | −2.5 | −1.3 | −0.3 |
| $\Delta\lambda_{(0°\text{-}30°)T50\%}$ | −0.9 | −1.1 | −1 | −1 | −1 |
| $\Delta\lambda_{(0°\text{-}30°)T20\%}$ | 4.6 | 3.4 | 2.5 | 1.8 | 1.2 |

It may be summarized from No. 3 to No. 10 in the above Table 2. The weight percentage of the infrared absorbing dye contained in the infrared and ultraviolet mixed absorbing film A2 is controlled to be between 1% and 3%, the weight percentage of the ultraviolet absorbing dye contained in the infrared and ultraviolet mixed absorbing film A2 is controlled to be between 4% and 10% and the rotation speed for forming the infrared and ultraviolet mixed absorbing film A2 is controlled between 400 rpm and 650 rpm.

The infrared and ultraviolet mixed absorbing film A2 of this embodiment satisfies the following conditions: in the infrared band, the difference of between the wavelength with the transmittance at 80% of the infrared and ultraviolet mixed absorbing film A2 and the wavelength with the reflectivity at 80% of the first multilayer film R1 falls in the range between 135 nm and 145 nm, the difference of between the wavelength with the transmittance at 50% of the infrared and ultraviolet mixed absorbing film A2 and the wavelength with the reflectivity at 50% of the first multi-layer film R1 falls in the range between 75 nm and 90 nm, and the difference of between the wavelength with the transmittance at 20% of the infrared and ultraviolet mixed absorbing film A2 and the wavelength with the reflectivity at 20% of the first multilayer film R1 falls in the range between 25 nm and 45 nm; in the ultraviolet band, the difference of between the wavelength with the transmittance at 80% of the infrared and ultraviolet mixed absorbing film A2 and the wavelength with the reflectivity at 80% of the first multi-layer film R1 falls in the range between 23 nm and 40 nm, the difference between the wavelength with the transmittance at 50% of the infrared and ultraviolet mixed absorbing film A2 and the wavelength with the reflectivity at 50% of the first multilayer film R1 ranges between 3 nm and 13 nm, and the difference between the wavelength with the transmittance at 20% of the infrared and ultraviolet mixed absorbing film A2 and the wavelength with the reflectivity at 20% of the first multilayer film R1 ranges between −15 nm and 0 nm.

When the infrared and ultraviolet mixed absorbing film A2 of this embodiment satisfies the above conditions, in the infrared band, the difference between the incident angle 0 degrees to 30 degrees with the transmittance at 50% of the infrared and ultraviolet mixed absorbing film A2 is less than 2 nm, and the difference between the incident angle 0 degrees to 30 degrees with the transmittance at 20% of the infrared and ultraviolet mixed absorbing film A2 is less than 6 nm; in the ultraviolet band, the difference between the incident angle 0 degrees to 30 degrees with the transmittance at 50% of the infrared and ultraviolet mixed absorbing film A2 ranges between −1 nm and 2 nm, and the difference between the incident angle 0 degrees to 30 degrees with the transmittance at 20% of the infrared and ultraviolet mixed absorbing film A2 is less than 9 nm. This also indicates the offset of the spectrum curves between the incident angles from 0 degrees to 30 degrees for the infrared and ultraviolet mixed absorbing film A2 is small. The problems of color shift, chromatic aberration, stray light and ghosting caused by the coating of the near-infrared filter is effectively solved.

Table 3 illustrates the difference (IR($\lambda_{T80\%}$)−UV($\lambda_{T80\%}$)) between the wavelength with the transmittance at 80% in the infrared band and the wavelength with the transmittance at 80% in the ultraviolet band for the infrared and ultraviolet mixed absorbing film A2, the difference (IR($\lambda_{T50\%}$)−UV($\lambda_{T50\%}$)) between the wavelength with the transmittance at 50% in the infrared band and the wavelength with the transmittance at 50% in the ultraviolet band for the infrared and ultraviolet mixed absorbing film A2, and the difference (IR($\lambda_{T20\%}$)−UV($\lambda_{T20\%}$)) between the wavelength with the transmittance at 20% in the infrared band and the wavelength with the transmittance at 20% in the ultraviolet band for the infrared and ultraviolet mixed absorbing film A2.

TABLE 3

| | Maximum | Minimum | Average |
|---|---|---|---|
| IR($\lambda_{T80\%}$)−UV($\lambda_{T80\%}$) | 161 | 126 | 140 |
| IR($\lambda_{T50\%}$)−UV($\lambda_{T50\%}$) | 237 | 196 | 208 |
| IR($\lambda_{T20\%}$)−UV($\lambda_{T20\%}$) | 308 | 245 | 261 |

It may be appreciated that the difference between the wavelength with the transmittance at 80% in the infrared band and the wavelength with the transmittance at 80% in the ultraviolet band for the infrared and ultraviolet mixed absorbing film A2 ranges between 126 nm and 161 nm, the difference between the wavelength with the transmittance at 50% in the infrared band and the wavelength with the transmittance at 50% in the ultraviolet band for the infrared and ultraviolet mixed absorbing film A2 ranges between 196 nm and 237 nm, and the difference between the wavelength with the transmittance at 20% in the infrared band and the wavelength with the transmittance at 20% in the ultraviolet band for the infrared and ultraviolet mixed absorbing film A2 ranges between 245 nm and 308 nm.

In the spectrum of the infrared and ultraviolet mixed absorbing film A2 of this embodiment, the ratio of the light transmission area of the wavelength less than 450 nm to the light penetration area of the wavelength between 650 nm and 700 nm is less than 10. That is, the spectrum curves of the infrared band and the ultraviolet band of the infrared and ultraviolet mixed layer absorption film A2 are symmetrical. This also illustrates that the spectrum curve of the infrared and ultraviolet mixed layer absorption film A2 does not shift to the ultraviolet band or the infrared band. Therefore, the non-visible region does not interfere with the function of the CMOS sensing element, thereby reducing the occurrence of ghosting.

The above effects can also be attained by replacing the infrared and ultraviolet mixed layer absorption film A2 of the present embodiment with an infrared absorbing structure and an ultraviolet absorbing structure separately (as shown in FIG. 4). The transparent substrate of the infrared ray and ultraviolet mixed absorbing film A2 of the present embodiment may include an infrared absorbing coloring material to achieve the above effects.

Third Embodiment

In view of the structure of the absorption type near-infrared filter of the third embodiment, the difference between the thickness of the first multilayer film and the thickness of the second multilayer film is less than 1000 nm.

According to the spectrum curve of the infrared absorbing structure A1 and the first multilayer film R1 (FIG. 7), in the infrared band, the difference (A1 ($\lambda_{T80\%}$)–R1($\lambda_{R80\%}$)) between the wavelength ($\lambda_{T80\%}$) with the transmittance at 80% of the infrared absorption film A1 and the wavelength ($\lambda_{R80\%}$) with the reflectivity at 80% of the first multilayer film R1, the difference (A1 ($\lambda_{T50\%}$)–R1 ($\lambda_{R50\%}$)) between the wavelength ($\lambda_{T50\%}$) with the transmittance at 50% of the infrared absorption film A1 and the wavelength ($\lambda_{R50\%}$) with the reflectivity at 50% of the first multilayer film R1, the difference (A1 ($\lambda_{T20\%}$)–R1 ($\lambda_{R20\%}$)) between the wavelength ($\lambda_{T20\%}$) with the transmittance at 20% of the infrared absorption film A1 and the wavelength ($\lambda_{R20\%}$) with the reflectivity at 20% of the first multilayer film R1, the difference ($\Delta\lambda_{(0°-30°)T50\%}$) between the incident angle 0 degrees to 30 degrees with the transmittance at 50% of the infrared absorption film A1, and the difference ($\Delta\lambda_{(0°-30°)T20\%}$) between the incident angle 0 degrees to 30 degrees with the transmittance at 20% of the infrared absorption film A1 are calculated.

TABLE 4

| No. | 1 | 2 | 3 | 4 | 5 |
|---|---|---|---|---|---|
| Infrared absorbing dye (%) | 0.68 | 0.94 | 1.24 | 1.47 | 1.53 |
| Transparent resin (%) | 100 | 100 | 100 | 100 | 100 |
| A1 ($\lambda_{T80\%}$)-R1 ($\lambda_{R80\%}$)(nm) | 122.7 | 126.9 | 129.7 | 130.6 | 131.3 |
| A1 ($\lambda_{T50\%}$)-R1 ($\lambda_{R50\%}$)(nm) | 59.4 | 69.0 | 75.1 | 77.0 | 77.8 |
| A1 ($\lambda_{T20\%}$)-R1 ($\lambda_{R20\%}$)nm) | 5.8 | 21.3 | 28.3 | 30.8 | 32.2 |
| $\Delta\lambda_{(0°-30°)T50\%}$ | 3.8 | 3.2 | 1.8 | 1.7 | 1.6 |
| $\Delta\lambda_{(0°-30°)T20\%}$ | 20.4 | 10.5 | 6.3 | 5.4 | 4.6 |

| No. | 6 | 7 | 8 | 9 | 10 |
|---|---|---|---|---|---|
| Infrared absorbing dye (%) | 1.58 | 1.75 | 1.83 | 2.02 | 2.73 |
| Transparent resin (%) | 100 | 100 | 100 | 100 | 100 |
| A1 ($\lambda_{T80\%}$)-R1 ($\lambda_{R80\%}$)(nm) | 132.4 | 133.1 | 134.1 | 135.3 | 136.2 |
| A1 ($\lambda_{T50\%}$)-R1 ($\lambda_{R50\%}$)(nm) | 80.0 | 80.9 | 81.5 | 84.2 | 84.6 |
| A1 ($\lambda_{T20\%}$)-R1 ($\lambda_{R20\%}$)nm) | 34.3 | 35.6 | 37.6 | 39.5 | 41.9 |
| $\Delta\lambda_{(0°-30°)T50\%}$ | 1.5 | 1.5 | 1.5 | 1.6 | 1.7 |
| $\Delta\lambda_{(0°-30°)T20\%}$ | 4.3 | 3.6 | 3.2 | 3.1 | 2.8 |

The thickness of the first multilayer film and the thickness of the second multilayer film of this embodiment ranges between 3300 nm and 3900 nm respectively. In other words, the first multilayer film and the second multilayer film of the present embodiment are symmetrically coated, as shown in FIG. 2.

Figure 7:
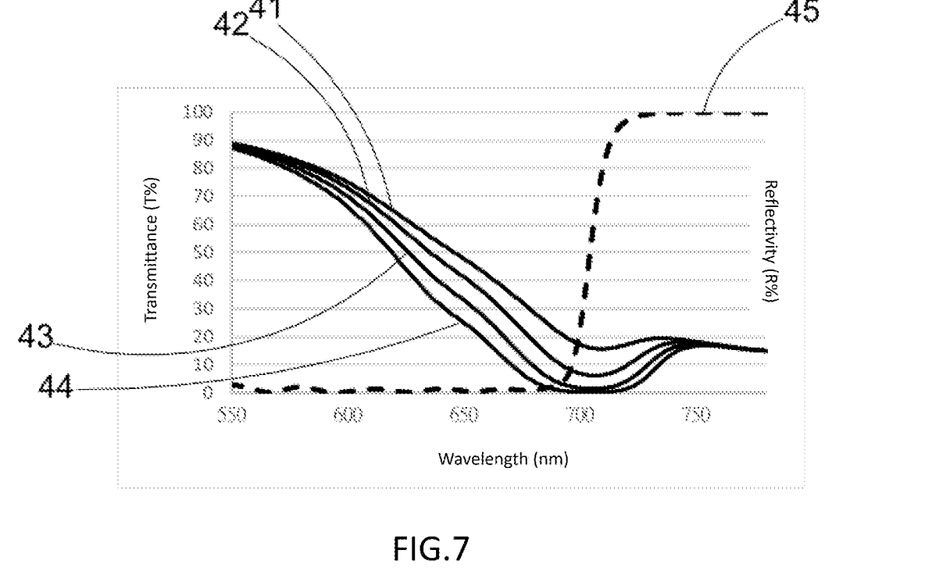
FIG. 7 shows the infrared spectrum of the absorption type near-infrared filter of the third embodiment and the fourth embodiment of the present disclosure.

Table 4 provides the actual data for ten sets of absorption films. The absorption film of the embodiment is a single infrared absorption film A1. The weight percentage of the infrared absorbing dye of the infrared absorbing structure A1 of each set is different. The rotating speed for forming the infrared absorbing structure A1 between 400 rpm and 650 rpm. Refer to FIG. 7 illustrating the ninth transmittance spectrum curve 41, the tenth transmittance spectrum curve 42, the eleventh transmittance spectrum curve 43, the twelfth transmittance spectrum curve 44, and the third reflectivity spectrum curve 45. The ninth transmittance spectrum curve 41, the tenth transmittance spectrum curve 42, the eleventh transmittance spectrum curve 43, and the twelfth transmittance spectrum curve 44 respectively illustrate the transmittance spectrum curve of the infrared absorption film A1 in the infrared band for No. 1, No. 2, No. 5 and No. 10 in the following table. The third reflectivity spectrum curve 45 is a reflectivity spectrum curve of the first multilayer film R1.

It may be summarized from No. 4 to No. 10 in the above Table 4. The weight percentage of the infrared absorbing dye contained in the infrared absorbing structure A1 is controlled to be between 1% and 3%, and the rotation speed for forming the infrared absorbing structure A1 is controlled between 400 rpm and 650 rpm. The spectrum of each of the infrared absorbing structure A1 satisfies the following conditions: the difference of between the wavelength with the transmittance at 80% of the infrared absorption film A1 and the wavelength with the reflectivity at 80% of the first multilayer film R1 falls in the range between 130 nm and 137 nm, the difference of between the wavelength with the transmittance at 50% of the infrared absorption film A1 and the wavelength with the reflectivity at 50% of the first multilayer film R1 falls in the range between 77 nm and 85 nm, and the difference of between the wavelength with the transmittance at 20% of the infrared absorption film A1 and the wavelength with the reflectivity at 20% of the first multilayer film R1 falls in the range between 30 nm and 42 nm.

When the spectrum of the infrared absorbing structure A1 satisfies the above conditions, the difference between the incident angle 0 degrees to 30 degrees with the transmittance at 50% of the infrared absorption film A1 is less than 2 nm, and the difference between the incident angle 0 degrees to 30 degrees with the transmittance at 20% of the infrared absorption film A1 is less than 6 nm. This indicates the offset of the spectrum curves between the incident angles from 0 degrees to 30 degrees for the infrared absorption film A1 is small. The problems of color shift, chromatic aberration, stray light and ghosting caused by the coating of the near-infrared filter is effectively solved. The transparent substrate of the infrared absorbing structure A1 of the present embodiment may also contain an infrared absorbing coloring material to achieve the above effects.

Fourth Embodiment

Different from the absorption type near-infrared filter in the third embodiment, the absorption type near-infrared filter of the present embodiment adopts an infrared and ultraviolet mixed absorbing film A2, as shown in FIG. 3.

Figure 8:
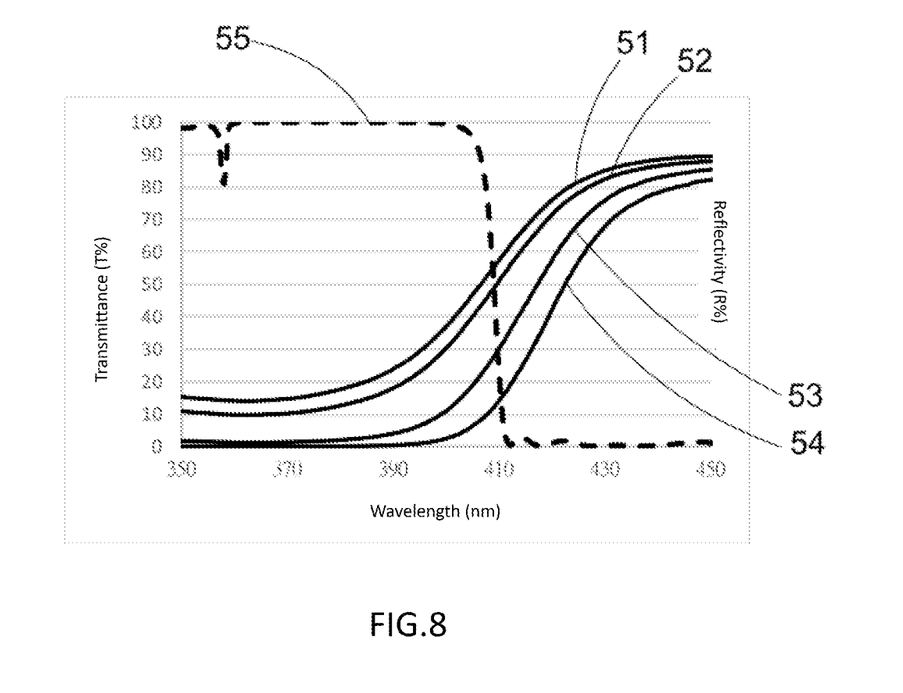
FIG. 8 shows the ultraviolet light spectrum of the absorption type near-infrared filter of the fourth embodiment of the present disclosure.

Table 2 below provides actual data for ten sets of absorption films. The absorption film is an infrared and ultraviolet mixed layer absorption film A2. The weight percentage of the infrared absorbing dye and the ultraviolet absorbing dye of each infrared and ultraviolet mixed layer absorption film A2 is different. The rotating speed for coating forming the infrared absorbing structure A2 between 400 rpm and 650 rpm. Refer to FIG. 7 and FIG. 8, the spectrum curves in the infrared band of the infrared and ultraviolet mixed layer absorption film A2 and the first multilayer film R1 of this embodiment are similar to the infrared absorption film A1 and the first multilayer film R1 of the second embodiment. Therefore, the spectrum curve of the infrared and ultraviolet mixed layer absorption film A2 in the infrared band of this embodiment may refer to FIG. 7. FIG. 8 includes the thirteenth transmittance spectrum curve 51, the fourteenth transmittance spectrum curve 52, the fifteenth transmittance spectrum curve 53, the sixteenth transmittance spectrum curve 54 and the fourth reflectivity spectrum curve 55. The thirteenth transmittance spectrum curve 51, the fourteenth transmittance spectrum curve 52, the fifteen transmittance spectrum curve 53, and the sixteenth transmittance spectrum curve 54 respectively illustrate the transmittance spectrum curve of the infrared and ultraviolet mixed layer absorption film A2 in the ultraviolet band for No. 1, No. 2, No. 5 and No. 10 in the following table. The fourth reflectivity spectrum curve 55 is a reflectivity spectrum curve of the second multilayer film R2 in the ultraviolet band.

According to the spectrum curve of the infrared and ultraviolet mixed layer absorption film A2, the first multilayer film R1 and the second multilayer film $R_2$ (as shown in FIG. 7 and FIG. 8), in the infrared band, the difference $(A2(\lambda_{T80})-R1(\lambda_{R80\%}))$ between the wavelength with the transmittance at 80% of the infrared and ultraviolet mixed layer absorption film A2 and the wavelength with the reflectivity at 80% of the first multilayer film R1, the difference $(A2(\lambda_{T50})-R1(\lambda_{R50\%}))$ between the wavelength with the transmittance at 50% of the infrared and ultraviolet mixed layer absorption film A2 and the wavelength with reflectivity at 50% of the first multilayer film R1, the difference $(A2(\lambda_{T20})-R1(\lambda_{R20\%}))$ between the wavelength with the transmittance at 20% of the infrared and ultraviolet mixed layer absorption film A2 and the wavelength with the reflectivity at 20% of the first multilayer film R1, the difference $(\Delta\lambda_{(0°-30°)T50\%})$ between the incident angle 0 degrees to 30 degrees with the transmittance at 50% of the infrared and ultraviolet mixed layer absorption film A2, and the difference $(\Delta\lambda_{(0°-30°)T20\%})$ between the incident angle 0 degrees to 30 degrees with the transmittance at 20% of the infrared and ultraviolet mixed layer absorption film A2 are calculated.

In the ultraviolet band, the difference $(A2(\lambda_{T80})-R_2(\lambda_{R80\%}))$ between the wavelength with the transmittance at 80% of the infrared and ultraviolet mixed layer absorption film A2 and the wavelength with the reflectivity at 80% of the second multilayer film $R_2$, the difference $(A2(\lambda_{T50})-R_2(\lambda_{R50\%}))$ between the wavelength with the transmittance at 50% of the infrared and ultraviolet mixed layer absorption film A2 and the wavelength $(\lambda_{R50\%})$ with the reflectivity at 50% of the second multilayer film $R_2$, the difference $(A2(\lambda_{T20\%})-R_2(\lambda_{R20\%}))$ between the wavelength with the transmittance at 20% of the infrared and ultraviolet mixed layer absorption film A2 and the wavelength $(\lambda_{R20\%})$ with the reflectivity at 20% of the second multilayer film $R_2$, the difference) $(\Delta\lambda_{(0°-30°)T50\%})$ between the incident angle 0 degrees to 30 degrees with the transmittance at 50% of the infrared and ultraviolet mixed layer absorption film A2, and the difference $(\Delta\lambda_{(0°-30°)T20\%})$ between the incident angle 0 degrees to 30 degrees with the transmittance at 20% of the infrared and ultraviolet mixed layer absorption film A2 are calculated.

TABLE 5

| No. | 1 | 2 | 3 | 4 | 5 |
|---|---|---|---|---|---|
| Infrared absorbing dye (%) | 0.68 | 0.94 | 1.24 | 1.47 | 1.53 |
| Ultraviolet absorbing dye (%) | 2.7 | 3.5 | 4.2 | 5.28 | 7.68 |
| Transparent resin (%) | 100 | 100 | 100 | 100 | 100 |

| No. | 6 | 7 | 8 | 9 | 10 |
|---|---|---|---|---|---|
| Infrared absorbing dye (%) | 1.58 | 1.75 | 1.83 | 2.02 | 2.73 |
| Ultraviolet absorbing dye (%) | 7.94 | 8.58 | 8.94 | 9.23 | 9.54 |
| Transparent resin (%) | 100 | 100 | 100 | 100 | 100 |

| IN THE INFRARED BAND | | | | | |
|---|---|---|---|---|---|
| No. | 1 | 2 | 3 | 4 | 5 |
| $A2(\lambda_{T80\%})$-R1 $(\lambda_{R80\%})$(nm) | 122.7 | 126.9 | 129.7 | 130.6 | 131.3 |
| $A2(\lambda_{T50\%})$-R1 $(\lambda_{R50\%})$(nm) | 59.4 | 69.0 | 75.1 | 77.0 | 77.8 |
| $A2(\lambda_{T20\%})$-R1 $(\lambda_{R20\%})$(nm) | 5.8 | 21.3 | 28.3 | 30.8 | 32.2 |
| $\Delta\lambda_{(0°-30°)T50\%}$ | 3.8 | 3.2 | 1.8 | 1.7 | 1.6 |
| $\Delta\lambda_{(0°-30°)T20\%}$ | 20.4 | 10.5 | 6.3 | 5.4 | 4.6 |

TABLE 5-continued

| No. | 6 | 7 | 8 | 9 | 10 |
|---|---|---|---|---|---|
| $A2(\lambda_{T80\%})\text{-}R1\ (\lambda_{R80\%})(nm)$ | 132.4 | 133.1 | 134.1 | 135.3 | 136.2 |
| $A2(\lambda_{T50\%})\text{-}R1\ (\lambda_{R50\%})(nm)$ | 80.0 | 80.9 | 81.5 | 84.2 | 84.6 |
| $A2(\lambda_{T20\%})\text{-}R1\ (\lambda_{R20\%})(nm)$ | 34.3 | 35.6 | 37.6 | 39.5 | 41.9 |
| $\Delta\lambda_{(0°\text{-}30°)T50\%}$ | 1.5 | 1.5 | 1.5 | 1.6 | 1.7 |
| $\Delta\lambda_{(0°\text{-}30°)T20\%}$ | 4.3 | 3.6 | 3.2 | 3.1 | 2.8 |

IN THE ULTRAVOILET BAND

| No. | 1 | 2 | 3 | 4 | 5 |
|---|---|---|---|---|---|
| $A2(\lambda_{T80\%})\text{-}R_2(\lambda_{R80\%})(nm)$ | 15.8 | 19.5 | 23.56 | 25.4 | 27.1 |
| $A2(\lambda_{T50\%})\text{-}R_2(\lambda_{R50\%})(nm)$ | -2.4 | 0.5 | 4.68 | 6.7 | 8.3 |
| $A2(\lambda_{T20\%})\text{-}R_2(\lambda_{R20\%})(nm)$ | -25.1 | -17.7 | -9.8 | -6.7 | -4.4 |
| $\Delta\lambda_{(0°\text{-}30°)T50\%}$ | 7.8 | 5.3 | 1.9 | 0.6 | -0.8 |
| $\Delta\lambda_{(0°\text{-}30°)T20\%}$ | 10.6 | 10.4 | 8.9 | 7.5 | 6.0 |

| No. | 6 | 7 | 8 | 9 | 10 |
|---|---|---|---|---|---|
| $A2(\lambda_{T80\%})\text{-}R_2(\lambda_{R80\%})(nm)$ | 29.0 | 30.3 | 32.0 | 33.8 | 36.1 |
| $A2(\lambda_{T50\%})\text{-}R_2(\lambda_{R50\%})(nm)$ | 9.6 | 10.7 | 11.7 | 12.6 | 13.5 |
| $A2(\lambda_{T20\%})\text{-}R_2(\lambda_{R20\%})(nm)$ | -2.5 | -0.9 | 0.3 | 1.5 | 2.5 |
| $\Delta\lambda_{(0°\text{-}30°)T50\%}$ | -0.9 | -1.1 | -1 | -1 | -1 |
| $\Delta\lambda_{(0°\text{-}30°)T20\%}$ | 4.8 | 3.4 | 2.6 | 1.8 | 1.2 |

It may be summarized from No. 4 to No. 10 in the above Table 5. The weight percentage of the infrared absorbing dye contained in the infrared and ultraviolet mixed absorbing film A2 is controlled to be between 1% and 3%, the weight percentage of the ultraviolet absorbing dye contained in the infrared and ultraviolet mixed absorbing film A2 is controlled to be between 4% and 10% and the rotation speed for forming the infrared and ultraviolet mixed absorbing film A2 is controlled between 400 rpm and 650 rpm. The infrared and ultraviolet mixed absorbing film A2 of this embodiment satisfies the following conditions: in the infrared band, the difference of between the wavelength with the transmittance at 80% of the infrared and ultraviolet mixed absorbing film A2 and the wavelength with the reflectivity at 80% of the first multilayer film R1 falls in the range between 130 nm and 137 nm, the difference of between the wavelength with the transmittance at 50% of the infrared and ultraviolet mixed absorbing film A2 and the wavelength with the reflectivity at 50% of the first multilayer film R1 falls in the range between 77 nm and 85 nm, and the difference of between the wavelength with the transmittance at 20% of the infrared and ultraviolet mixed absorbing film A2 and the wavelength with the reflectivity at 20% of the first multilayer film R1 falls in the range between 30 nm and 42 nm.

In the ultraviolet band, the difference of between the wavelength with the transmittance at 80% of the infrared and ultraviolet mixed absorbing film A2 and the wavelength with the reflectivity at 80% of the second multilayer film $R_2$ falls in the range between 25 nm and 37 nm, the difference of between the wavelength with the transmittance at 50% of the infrared and ultraviolet mixed absorbing film A2 and the wavelength with the reflectivity at 50% of the second multilayer film $R_2$ falls in the range between 6 nm and 14 nm, and the difference of between the wavelength with the transmittance at 20% of the infrared and ultraviolet mixed absorbing film A2 and the wavelength with the reflectivity at 20% of the second multilayer film $R_2$ falls in the range between -6 nm and 2.5 nm.

When the infrared and ultraviolet mixed absorbing film A2 of this embodiment satisfies the above conditions, in the infrared band, the difference between the incident angle 0 degrees to 30 degrees with the transmittance at 50% of the infrared and ultraviolet mixed absorbing film A2 is less than 2 nm, and the difference between the incident angle 0 degrees to 30 degrees with the transmittance at 20% of the infrared and ultraviolet mixed absorbing film A2 is less than 6 nm; in the ultraviolet band, the difference between the incident angle 0 degrees to 30 degrees with the transmittance at 50% of the infrared and ultraviolet mixed absorbing film A2 ranges between -1 nm and 2 nm, and the difference between the incident angle 0 degrees to 30 degrees with the transmittance at 20% of the infrared and ultraviolet mixed absorbing film A2 is less than 8 nm. This also indicates the offset of the spectrum curves between the incident angles from 0 degrees to 30 degrees for the infrared and ultraviolet mixed absorbing film A2 is small. The problems of color shift, chromatic aberration, stray light and ghosting caused by the coating of the near-infrared filter is effectively solved.

Table 6 illustrates the difference $(IR(\lambda_{T80\%})-UV(\lambda_{T80\%}))$ between the wavelength with the transmittance at 80% in the infrared band and the wavelength with the transmittance at 80% in the ultraviolet band for the infrared and ultraviolet mixed absorbing film A2, the difference $(IR(\lambda_{T50\%})-UV(\lambda_{T50\%}))$ between the wavelength with the transmittance at 50% in the infrared band and the wavelength with the transmittance at 50% in the ultraviolet band for the infrared and ultraviolet mixed absorbing film A2, and the difference $(IR(\lambda_{T20\%})-UV(\lambda_{T20\%}))$ between the wavelength with the transmittance at 20% in the infrared band and the wavelength with the transmittance at 20% in the ultraviolet band for the infrared and ultraviolet mixed absorbing film A2.

TABLE 6

| | Maximum | Minimum | Average |
|---|---|---|---|
| $IR(\lambda_{T80\%})\text{-}UV(\lambda_{T80\%})$ | 164 | 130 | 144 |
| $IR(\lambda_{T50\%})\text{-}UV(\lambda_{T50\%})$ | 239 | 197 | 212 |
| $IR(\lambda_{T20\%})\text{-}UV(\lambda_{T20\%})$ | 309 | 245 | 262 |

It may be appreciated that the difference between the wavelength with the transmittance at 80% in the infrared band and the wavelength with the transmittance at 80% in the ultraviolet band for the infrared and ultraviolet mixed absorbing film A2 ranges between 130 nm and 164 nm, the difference between the wavelength with the transmittance at 50% in the infrared band and the wavelength with the transmittance at 50% in the ultraviolet band for the infrared and ultraviolet mixed absorbing film A2 ranges between 197 nm and 239 nm, and the difference between the wavelength with the transmittance at 20% in the infrared band and the wavelength with the transmittance at 20% in the ultraviolet band for the infrared and ultraviolet mixed absorbing film A2 ranges between 245 nm and 309 nm.

In the spectrum of the infrared and ultraviolet mixed absorbing film A2 of this embodiment, the ratio of the light transmission area of the wavelength less than 450 nm to the light penetration area of the wavelength between 650 nm and 700 nm is less than 10. That is, the spectrum curves of the infrared band and the ultraviolet band of the infrared and ultraviolet mixed layer absorption film A2 are symmetrical. This also illustrates that the spectrum curve of the infrared and ultraviolet mixed layer absorption film A2 does not shift to the ultraviolet band or the infrared band. Therefore, the non-visible region does not interfere with the function of the CMOS sensing element, thereby reducing the occurrence of ghosting.

The above effects can also be attained by replacing the infrared and ultraviolet mixed layer absorption film A2 of the present embodiment with an infrared absorbing structure and an ultraviolet absorbing structure separately. The transparent substrate of the infrared ray and ultraviolet mixed absorbing film A2 of the present embodiment may include an infrared absorbing coloring material to achieve the above effects.

In summary, the present disclosure discloses an absorption type near-infrared filter. The content of the infrared absorbing dye or/and the ultraviolet absorbing dye in the absorption film of the absorption type near-infrared filter of the present disclosure is adjusted such that the absorption film may at least satisfy the conditions: in the infrared band, the difference between the wavelength with the transmittance at 80% of the absorption film and the wavelength with the reflectivity at 80% of the first multilayer film ranges between 130 nm and 145 nm; the difference between the wavelength with the transmittance at 50% of the absorption film and the wavelength with the reflectivity at 50% of the first multilayer film ranges between 75 nm and 90 nm; the difference between the wavelength with the transmittance at 20% of the absorption film and the wavelength with the reflectivity at 20% of the first multilayer film ranges between 25 nm and 45 nm; the absolute difference between the wavelength with the transmittance at 80% of the absorption film and the wavelength with the reflectivity at 50% of the absorption film is lower than 50 nm; and the absolute difference between the wavelength with the transmittance at 50% of the absorption film and the wavelength with the transmittance at 20% of the absorption film is lower than 42 nm. The above various embodiments show that the absorption type near-infrared filter of the present disclosure can avoid the problems such as color shift, chromatic aberration, stray light and ghosting, thereby improving the quality of the picture.

It is to be understood that the term "comprises", "comprising", or any other variants thereof, is intended to encompass a non-exclusive inclusion, such that a process, method, article, or device of a series of elements not only includes those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

The invention claimed is:

1. An absorption type near-infrared filter, comprising:
a first multilayer film;
a second multilayer film; and
an absorption film between the first multilayer film and the second multilayer film, the absorption film comprising an infrared absorbing dye with a weight percentage between 1% and 3% and an ultraviolet absorbing dye in a weight percentage between 4% and 10%;
wherein in the ultraviolet band, the difference of between the wavelength with the transmittance at 80% of the absorbing film and the wavelength with the reflectivity at 80% of the first multilayer film falls in the range between 25 nm and 37 nm, the difference of between the wavelength with the transmittance at 50% of the absorbing film and the wavelength with the reflectivity at 50% of the first multilayer film falls in the range between 6 nm and 14 nm, and the difference of between the wavelength with the transmittance at 20% of the absorbing film and the wavelength with the reflectivity at 20% of the first multilayer film falls in the range between −6 nm and 2.5 nm.

2. The absorption type near-infrared filter according to claim 1, wherein in the infrared band, the difference between the wavelength with the transmittance at 80% of the absorption film and the wavelength with the reflectivity at 80% of the first multilayer film ranges between 130 nm and 145 nm; the difference between the wavelength with the transmittance at 50% of the absorption film and the wavelength with the reflectivity at 50% of the first multilayer film ranges between 75 nm and 90 nm; the difference between the wavelength with the transmittance at 20% of the absorption film and the wavelength with the reflectivity at 20% of the first multilayer film ranges between 25 nm and 45 nm.

3. The absorption type near-infrared filter according to claim 1, wherein the absolute difference between the wavelength with the transmittance at 80% of the absorption film and the wavelength with the transmittance at 50% of the absorption film is lower than 50 nm; and the absolute difference between the wavelength with the transmittance at 50% of the absorption film and the wavelength with the transmittance at 20% of the absorption film is lower than 42 nm.

4. The absorption type near-infrared filter according to claim 1, wherein in the ultraviolet band, the difference between the wavelength with the transmittance at of the absorption film and the wavelength with the reflectivity at 80% of the first multilayer film ranges between 23 nm and 40 nm; the difference between the wavelength with the transmittance at 50% of the absorption film 11 and the wavelength with the reflectivity at 50% of the first multilayer film 10 ranges between 3 nm and 14 nm; the difference between the wavelength with the transmittance at 20% of the absorption film 11 and the wavelength with the reflectivity at 20% of the first multilayer film 10 ranges between −15 nm and 2.5 nm.

5. The absorption type near-infrared filter according to claim 1, wherein in the ultraviolet band, the absolute difference between the wavelength with the transmittance at 80% of the absorption film and the wavelength with the transmittance at 50% of the absorption film is lower than 23 nm; the absolute difference between the wavelength with the transmittance at 50% of the absorption film and the wavelength with the transmittance at 20% of the absorption film is lower than 16 nm.

6. The absorption type near-infrared filter according to claim 1, wherein in the ultraviolet band, the difference between the wavelength with the transmittance at 80% of the absorption film in the infrared band and the wavelength with the transmittance at 80% of the absorption film in the ultraviolet band ranges between 126 nm and 164 nm; the difference between the wavelength with the transmittance at 50% of the absorption film in the infrared band and the wavelength with the transmittance at 50% of the absorption film in the ultraviolet band ranges between 195 nm and 239 nm; the difference between the wavelength with the transmittance at 20% of the absorption film in the infrared band and the wavelength with the transmittance at 20% of the absorption film in the ultraviolet band ranges between 244 nm and 309 nm.

7. The absorption type near-infrared filter according to claim 1, wherein the difference between the thickness of the first multilayer film and the thickness of the second multilayer film is greater than 3800 nm, and in the ultraviolet band, the difference of between the wavelength with the transmittance at 50% of the absorption film and the wavelength with the reflectivity at 50% of the first multilayer film falls in the range between 3 nm and 13 nm, and the difference of between the wavelength with the transmittance at 20% of the absorption film and the wavelength with the reflectivity at 20% of the first multilayer film falls in the range between −15 nm and 0 nm.

8. The absorption type near-infrared filter according to claim 1, wherein the difference between the thickness of the first multilayer film and the thickness of the second multilayer film is less than 1000 nm.

9. The absorption type near-infrared filter according to claim 1, wherein the difference between the thickness of the first multilayer film and the thickness of the second multilayer film is greater than 3000 nm, and in the infrared band, the difference of between the wavelength with the transmittance at 80% of the absorption film and the wavelength with the reflectivity at 80% of the first multilayer film falls in the range between 135 nm and 145 nm.

10. The absorption type near-infrared filter according to claim 1, wherein the difference between the thickness of the first multilayer film and the thickness of the second multilayer film is less than 1000 nm, in the infrared band, the difference of between the wavelength with the transmittance at 80% of the infrared absorption film and the wavelength with the reflectivity at 80% of the first multilayer film falls in the range between 130 nm and 137 nm, the difference of between the wavelength with the transmittance at 50% of the infrared absorption film and the wavelength with the reflectivity at 50% of the first multilayer film falls in the range between 77 nm and 85 nm, and the difference of between the wavelength with the transmittance at 20% of the infrared absorption film and the wavelength with the reflectivity at 20% of the first multilayer film falls in the range between 30 nm and 42 nm.

11. The absorption type near-infrared filter according to claim 1, wherein the difference between the wavelength with the transmittance at of the absorption film in the infrared band and the wavelength with the reflectivity at 80% of the absorption film in the ultraviolet band ranges between 126 nm and 161 nm.

12. An absorption type near-infrared filter, comprising:
a first multilayer film;
a second multilayer film; and
an absorption film between the first multilayer film and the second multilayer film, the absorption film comprising an infrared absorbing dye with a weight percentage between 1% and 3%;
wherein the absorption film comprises a transparent substrate and an infrared and ultraviolet mixed layer formed on the transparent substrate, and the infrared absorbing dye and an ultraviolet absorbing dye are distributed in the infrared and ultraviolet mixed layer.

13. The absorption type near-infrared filter according to claim 12, wherein in the ultraviolet band, the difference of between the wavelength with the transmittance at 80% of the absorbing film and the wavelength with the reflectivity at 80% of the first multilayer film falls in the range between 25 nm and 37 nm, the difference of between the wavelength with the transmittance at 50% of the absorbing film and the wavelength with the reflectivity at 50% of the first multilayer film falls in the range between 6 nm and 14 nm, and the difference of between the wavelength with the transmittance at 20% of the absorbing film and the wavelength with the reflectivity at 20% of the first multilayer film falls in the range between −6 nm and 2.5 nm.

14. The absorption type near-infrared filter according to claim 12, wherein in the infrared band, the difference between the wavelength with the transmittance at 80% of the absorption film and the wavelength with the reflectivity at 80% of the first multilayer film ranges between 130 nm and 145 nm; the difference between the wavelength with the transmittance at 50% of the absorption film and the wavelength with the reflectivity at 50% of the first multilayer film ranges between 75 nm and 90 nm; the difference between the wavelength with the transmittance at 20% of the absorption film and the wavelength with the reflectivity at 20% of the first multilayer film ranges between 25 nm and 45 nm.

15. The absorption type near-infrared filter according to claim 12, wherein in the infrared band, the absolute difference between the wavelength with the transmittance at 50% of the absorption film and the wavelength with the transmittance at 20% of the absorption film is lower than 42 nm.

16. The absorption type near-infrared filter according to claim 12, wherein in the ultraviolet band, the absolute difference between the wavelength with the transmittance at 80% of the absorption film and the wavelength with the transmittance at 50% of the absorption film is lower than 23 nm; the absolute difference between the wavelength with the transmittance at 50% of the absorption film and the wavelength with the transmittance at 20% of the absorption film is lower than 16 nm.

17. The absorption type near-infrared filter according to claim 12, wherein in the ultraviolet band, the difference between the wavelength with the transmittance at 80% of the absorption film in the infrared band and the wavelength with the transmittance at 80% of the absorption film in the ultraviolet band ranges between 126 nm and 164 nm; the difference between the wavelength with the transmittance at 50% of the absorption film in the infrared band and the wavelength with the transmittance at 50% of the absorption film in the ultraviolet band ranges between 195 nm and 239 nm; the difference between the wavelength with the transmittance at 20% of the absorption film in the infrared band and the wavelength with the transmittance at 20% of the absorption film in the ultraviolet band ranges between 244 nm and 309 nm.

18. An absorption type near-infrared filter, comprising:
a first multilayer film;
a second multilayer film; and
an absorption film between the first multilayer film and the second multilayer film, the absorption film comprising an infrared absorbing dye with a weight percentage between 1% and 3% and an ultraviolet absorbing dye in a weight percentage between 4% and 10%;
wherein the absolute difference between the wavelength with the transmittance at 80% of the absorption film and the wavelength with the transmittance at 50% of the absorption film is lower than 50 nm;
wherein in the ultraviolet band, the absolute difference between the wavelength with the transmittance at 80% of the absorption film and the wavelength with the transmittance at 50% of the absorption film is lower than 23 nm; the absolute difference between the wavelength with the transmittance at 50% of the absorption film and the wavelength with the transmittance at 20% of the absorption film is lower than 16 nm.

19. The absorption type near-infrared filter according to claim 18, wherein in the infrared band, the absolute difference between the wavelength with the transmittance at 50% of the absorption film and the wavelength with the transmittance at 20% of the absorption film is lower than 42 nm.

20. The absorption type near-infrared filter according to claim 19, wherein in the infrared band, the difference between the wavelength with the transmittance at 80% of the absorption film and the wavelength with the reflectivity at 80% of the first multilayer film ranges between 130 nm and 145 nm; the difference between the wavelength with the transmittance at 50% of the absorption film and the wavelength with the reflectivity at 50% of the first multilayer film ranges between 75 nm and 90 nm; the difference between the wavelength with the transmittance at 20% of the absorption film and the wavelength with the reflectivity at 20% of the first multilayer film ranges between 25 nm and 45 nm.

* * * * *